(12) United States Patent
Smith

(10) Patent No.: US 7,142,556 B1
(45) Date of Patent: Nov. 28, 2006

(54) MEDIA ACCESS CONTROL SCHEME FOR SERIALLY LINKED DEVICES

(75) Inventor: Malcolm M Smith, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 1125 days.

(21) Appl. No.: 09/752,844

(22) Filed: Dec. 28, 2000

(51) Int. Cl.
*H04J 3/02* (2006.01)

(52) U.S. Cl. .................. 370/462; 370/445; 370/447; 370/461

(58) Field of Classification Search ................ 370/382, 370/364, 464, 465, 519, 516, 461, 462, 463, 370/229, 438, 445, 447, 439; 700/17, 83; 709/223, 224
See application file for complete search history.

(56) References Cited

U.S. PATENT DOCUMENTS

| | | | | |
|---|---|---|---|---|
| 4,543,654 A * | 9/1985 | Jones | ................... | 370/445 |
| 4,670,872 A * | 6/1987 | Cordill | ................... | 370/447 |
| 5,378,067 A * | 1/1995 | Severson et al. | ........... | 709/237 |
| 5,841,992 A * | 11/1998 | Martin | ................... | 709/250 |
| 6,067,585 A | 5/2000 | Hoang | ................... | 710/11 |
| 6,400,725 B1 * | 6/2002 | Ross | ................... | 370/445 |
| 6,438,594 B1 | 8/2002 | Bowman-Amuah | ......... | 709/225 |
| 6,477,434 B1 * | 11/2002 | Wewalaarachchi et al. | ... | 700/83 |
| 6,493,351 B1 * | 12/2002 | Shideler | ................... | 370/438 |
| 6,615,253 B1 | 9/2003 | Bowman-Amuah | ......... | 709/219 |
| 6,625,144 B1 * | 9/2003 | El-Batal et al. | ............. | 370/364 |
| 6,625,163 B1 * | 9/2003 | Shideler et al. | ............. | 370/445 |
| 6,636,519 B1 | 10/2003 | Walsh et al. | ................. | 370/401 |
| 6,658,010 B1 | 12/2003 | Enns et al. | ................... | 370/401 |
| 6,683,851 B1 * | 1/2004 | Willkie et al. | ............... | 370/235 |

OTHER PUBLICATIONS

Zs- Zilod 8530 Serial Communications Controller WWW. vorlesungen.uni.osnabrueck.de☐☐4/17/97.*
Data Terminal ready and Data carrier detect WWW.bigwebmaster.com.*
Unix Manual Page WWW.scit.wlv.ac.uk.*
Appendix B Interfaces.*
RS-232 Characteristics WWW2.rad.com.*
Z08030/8530 Serial Communications Controller www.zilog.com.*

* cited by examiner

*Primary Examiner*—Seema S. Rao
*Assistant Examiner*—Michael J. Moore
(74) *Attorney, Agent, or Firm*—Baker Botts L.L.P.

(57) ABSTRACT

A network includes a master station and terminal devices each coupled using a serial data interface to a modem that in turn couples to a twisted pair line. These elements communicate information using a media access control scheme in which a device claims access to the twisted pair line and communicates information on the twisted pair line while the line is claimed. More specifically, a device with information to transmit claims the line by asserting a request to send (RTS) line of its serial data interface, communicates information while the RTS line is asserted, and de-asserts the RTS line upon completing transmission. In addition, the master station and terminal devices implement delays between communications on the line in order to reduce the probability of data collisions.

19 Claims, 2 Drawing Sheets

MEDIA ACCESS CONTROL SCHEME FOR SERIALLY LINKED DEVICES

TECHNICAL FIELD OF THE INVENTION

The present invention relates generally to communications for serial devices and more particularly to a media access control scheme for serially linked devices.

BACKGROUND OF THE INVENTION

Supervisory control and data acquisition (SCADA) systems, as the name implies, provide management and control of distributed systems. Many infrastructure providers, such as utility companies, use SCADA systems to control distributed equipment, such as relays and switches. In many applications, one of the most pervasive SCADA communications technologies is a low speed RS-232 interface connected to a two or four-wire communications line. For example, a master station may control several hundred devices using a two-wire multidrop scheme implementing a point to multipoint master/slave system. In these master/slave systems, the master station sequentially polls each of the control devices to retrieve data. However, a serial polling scheme has a throughput limited by the timeout associated with any one of the controlled devices. With increasing demands on modern systems, due in part to pressures such as deregulation, these systems require a more robust and secure system for management and control.

SUMMARY OF THE INVENTION

In accordance with the present invention, a media access control scheme for serially linked devices is provided which substantially eliminates or reduces disadvantages and problems associated with previous techniques. In a particular embodiment, the present invention satisfies a need for a secure, robust system supporting management and control using communications between a master station and any number of controlled devices. More specifically, elements within the system communicate using a media access control scheme that supports peer-to-peer communications, such as internet protocol (IP) communications.

According to one embodiment of the present invention, a communications apparatus includes a serial data interface having a data carrier detect (DCD) line and a request to send (RTS) line each coupled to a modem, wherein the modem couples to a twisted pair line that couples to remote devices. The communications apparatus also includes a processor that detects a de-assertion of the DCD line, asserts the RTS line after a period of time from detecting the de-assertion of the DCD line, communicates information to a selected one of the remote devices while the RTS line is asserted, and de-asserts the RTS line after communicating the information.

In accordance with another embodiment of the present invention, a method for communicating information over a twisted pair line detects a de-assertion of a DCD line for a serial data interface, wherein the serial data interface couples to a modem coupled to a twisted pair line. After a period of time from detecting the de-asserting of the DCD line, the method de-asserts an RTS line for the serial data interface, wherein asserting the RTS line requests the modem to generate a carrier signal that causes assertion of DCD lines for remote devices coupled to the twisted pair line. The method also communicates information to a selected one of the remote devices while the RTS line is asserted and de-asserts the RTS line after communicating the information. More specifically, the information communicated may include internet protocol (IP) packets.

Various embodiments of the present invention provide numerous technical advantages. A system using these techniques can increase throughput and reduce communications latencies by more efficiently using available bandwidth. For example, a device having information for communication to a master station need not wait for the master station to poll the device and request the information. Rather, using these techniques, the device can take control of the transmission medium and communicate the information to the master station. In addition, these techniques allow a master station and terminal devices to establish peer-to-peer data-link layer connections that support advanced communications protocols such as IP. These advanced communications protocols offer increased security and responsiveness that may be used to shore up aging and out-of-date systems, such as critical infrastructure providers. Moreover, while these techniques may provide increased security, responsiveness, and throughput, systems may implement these techniques using existing infrastructure. For example, these media access control protocols may be implemented by software without requiring any changes to the underlying hardware or communications media.

Other technical advantages of the present invention will be readily apparent to one skilled in the art from the following figures, descriptions, and claims.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF THE DRAWINGS

Figure 1:
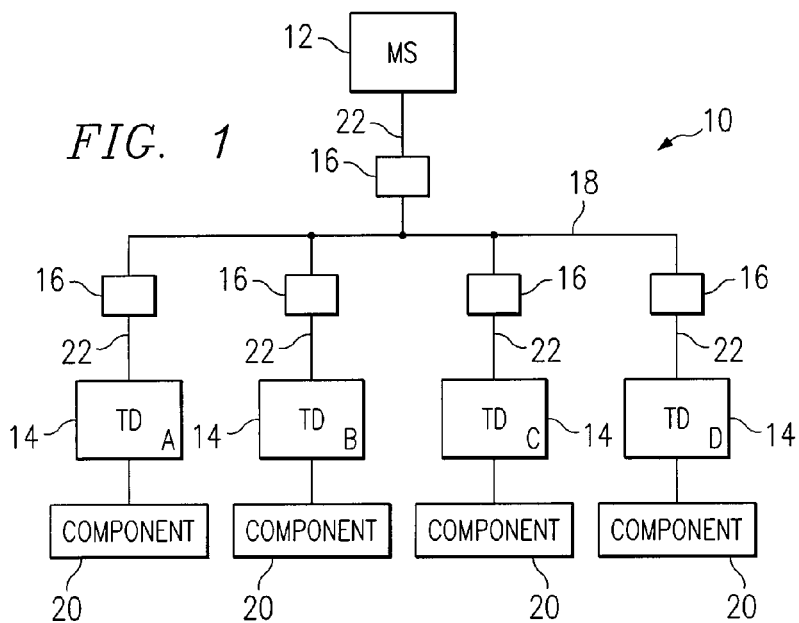
FIG. 1 illustrates a two-wire multidrop network having a master station coupled to terminal devices.

FIG. 1 illustrates a two-wire multidrop network, indicated generally at 10, that includes a master station 12 and terminal devices 14 each using a modem 16 to couple to a twisted pair line 18. Terminal devices 14 also couple to components 20. In general, master station 12 and terminal devices 14 communicate over line 18 using a media access control scheme to permit management and control of components 20. More specifically, the media access control scheme allows one of master station 12 and terminal devices 14 to claim access to line 18 and to communicate information while having line 18 claimed.

Master station 12 represents hardware and/or software supporting management and control of any number of distributed components 20. For example, in a power grid, master station 12 may control any number of devices such as relays, switches, and meters. Using line 18, station 12 communicates with terminal devices 14 to manage, control, and receive information from components 20. To access line 18, station 12 couples to modem 16 using a serial line 22. Serial line 22 includes a request to send (RTS) line and a data carrier detect (DCD) line used for control and signaling and a transmit line and a receive line for communicating information. Serial line 22 may also include other lines, however, some or all of these other lines may not be used in communications with modem 16.

Modem 16 couples to line 18, which in this embodiment includes two separate electrically conductive pathways. Modem 16 communicates information and signals with station 12 using the RTS, DCD, transmit, and receive lines, and modem 16 modulates and demodulate signals on line 18 to communicate information with modems 16 for terminal devices 14. Modems 16 represent any suitable hardware and/or software having a serial data interface for coupling to a device and a line interface for coupling to a transmission medium such as line 18. For example, many SCADA systems use common, commercially available modems such as BELL 202 modems.

Terminal devices 14 represent hardware and/or software supporting management and control of components 20 through communications with station 12. For example, consider a metering component located at a residence to measure power usage. For this example, terminal device 14 represents the co-located hardware and/or software that permits station 12 to remotely manage and control the metering component and retrieve metering information. However, terminal devices 14 may support management and control of any suitable components 20. Components 20 represent any hardware and/or software, such as meters, relays, and switches, that may be managed, controlled, or accessed by terminal devices 14. According to a particular embodiment, terminal devices 14 control components 20 responsive to communications with station 12.

In operation, station 12 and terminal devices 14 use a media access control scheme in which a single element claims access to line 18 and communicates information to one or more other elements while access to line 18 is claimed. For example, consider terminal device 14 labeled A (terminal A), having information for communication to station 12. To claim access to line 18, terminal A asserts a request to send (RTS) line on serial line 22 that couples to modem 16. Upon receiving an assertion of the RTS line, modem 16 generates a carrier signal on line 18 that causes each of the other modems 16 to assert a data carrier detect (DCD) line on its serial line 22. Thus, by asserting the RTS line, terminal A claims line 18 by causing the assertion of DCD lines for other elements coupled to line 18. This notifies all other elements, through the assertion of their DCD lines, that an element has claimed line 18.

While maintaining the RTS line assertion, terminal A may communicate the information for reception by station 12. Upon communicating the information, each of the other devices coupled to line 18 using modems 16, such as station 12 and other terminal devices 14, receive this information using the receive line of serial line 22. To indicate the appropriate recipient, a portion of the information transmitted by terminal A may include address information to permit a receiving device to determine whether the received information was intended for it. For example, information transmitted by terminal A may include a header indicating the address of the intended recipient. Furthermore, the elements in network 10 may use IP communications, and thus, the information communicated by terminal A may include IP packets for delivery to one or more other elements coupled to line 18. Upon completing communications, terminal A de-asserts the RTS line, which prompts modem 16 to discontinue generating the carrier signal on line 18. This in turn causes other modems 16 to de-assert their respective DCD lines, which signals to the elements using these other modems 16 that the claim of line 18 has been released.

As discussed in the preceding example, when an element claims line 18 by asserting an RTS line, modems 16 for other devices coupled to line 18 assert a DCD line of serial line 22. This DCD line assertion provides notification that information may soon be received on a receive line of serial line 22. In addition, a DCD line assertion indicates that another element coupled to line 18 has claimed access to line 18. Therefore, while an element's DCD line is asserted, that element will refrain from attempting to claim line 18 and from communicating information. Thus, an element having information for communication waits until its DCD line is not longer asserted before communicating that information.

However, to prevent collisions of information transmitted by multiple devices immediately following de-assertion of their DCD lines, an element in network 10 will delay attempts to claim line 18 for some period of time following the de-assertion of its DCD line. For example, during the communication of information from terminal A to station 12, terminal B may identify information for communication to station 12. However, terminal B refrains from attempting to claim line 18, because the assertion of the RTS line of terminal A causes modem 16 of terminal B to assert a DCD line coupled to terminal B. This asserted DCD line notifies terminal B that another element currently has claimed line 18. However, as previously discussed, upon completing communication of information to station 12, terminal A de-asserts its RTS line, which causes de-assertion of DCD lines for other elements, including the DCD line for terminal B. Upon detecting the de-assertion of its DCD line, terminal B does not immediately attempt to claim line 18. Rather, terminal B waits some period of time before claiming line 18 to communicate information.

The delay period between de-assertion of a DCD line and an attempt to claim line 18 may be any random, predetermined, and/or dynamically calculated time designed to prevent collisions of information transmission on line 18. According to a particular embodiment, the delay period includes a random period of time after the de-assertion of a DCD line. Thus, for example, if terminal B and terminal C each have data for communication after terminal A releases line 18, terminal B and terminal C each calculate a random delay period and wait these random delay periods before attempting to claim line 18. This helps to prevent both terminal B and terminal C attempting to claim line 18 simultaneously. In accordance with another embodiment, the delay period for an element wishing to claim line 18 may include a propagation delay for signals traveling on line 18 between elements. This propagation delay may be predetermined or calculated during communications.

Collision avoidance based on varying delays provides the primary data-link layer protection against interference between multiple communicating devices. Because of the limited interface provided by modems 16 to line 18, collisions of information transmitted by multiple devices simultaneously may be difficult or impossible to detect at the data-link layer. These collisions may occur if multiple elements delay for a nearly identical time before attempting to claim line 18 and communicate information. Thus, network 10 contemplates terminal devices 14 and station 12 using any suitable delay periods calculated using appropriate techniques designed to minimize the possibility of data collisions. However, in the event of a data collision, upper level data communications protocols may provide for recovery and retransmission of lost data. For example, transmission control protocol (TCP) provides for retransmission of packets in certain circumstances.

Using these media access control techniques, elements of network 10 implement peer-to-peer communications that permits the use of protocols not supported by master/slave configurations. For example, elements in network 10 may communicate using IP communications, which require a peer-to-peer data-link layer. The use of advanced protocols supports increased security and functionality. This, combined with the increased throughput realized by removing sequential polling, allows these media access control schemes to support a robust, secure communications network using legacy equipment.

Moreover, these techniques exploit the operation of equipment currently in use in many applications. For example, many SCADA systems use common, commercially available modems, such as BELL 202 modems, to connect stations 12 and terminal devices 14. These modems typically have specified responses to various signals. For example, in response to receiving an RTS assertion over serial line 22, modem 16 generates a carrier signal on line 18. Each modem 16 detecting the carrier signal on line 18 asserts a DCD line of its serial line 22 in response. Therefore, logic controlling the interface with modem 16 may be used to implement a media access control scheme similar to that described. For example, software installed on terminal devices 14 may implement these media access control techniques. However, network 10 contemplates terminal devices 14 and station 12 using any suitable logic implemented in hardware and/or software.

Figure 2:
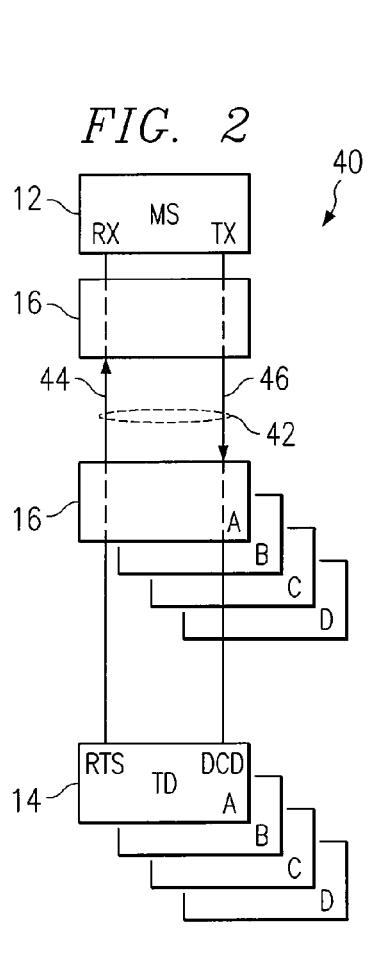
FIG. 2 illustrates a four-wire multidrop network having a master station coupled to terminal devices.

FIG. 2 illustrates a four-wire multidrop network, indicated generally at 40, that includes master station 12 and terminal devices 14 each coupled to modem 16 supporting communications over a four-wire line 42. Network 40 illustrates a typical four-wire multidrop network having one twisted pair line for communications from terminal devices 14 to station 12 and a second twisted pair line for communications from station 12 to terminal devices 14. In general, terminal devices 14 in network 40 use operations similar to those described for terminal devices 40 in network 10 above. More specifically, terminal devices 14 in network 40 claim access to line 42 by asserting an RTS signal and receive indication that another device has claimed line 42 by detecting the assertion of a DCD line by modem 16. To facilitate this operation, station 12 acts as a repeater for signals received from terminal devices 14.

For example, consider terminal A having information for communication to station 12. As previously discussed, terminal A waits to attempt to claim line 42 until some period of time has passed since the last assertion of DCD. To claim line 42, terminal A asserts an RTS signal to modem 16, which in response generates a carrier signal on twisted pair line 44 of line 42. This causes modem 16 of carrier 12 to assert a DCD line to station 12. In response, station 12 asserts its RTS line causing modem 16 of station 12 to generate an equivalent carrier signal on twisted pair line 46 of line 42. This carrier signal on twisted pair line 46 causes modems 16 of other terminal devices 14 to assert their DCD lines, thus indicating to all terminal devices 14 that terminal A has claimed line 42.

While maintaining the assertion of the RTS line, terminal A communicates information using modem 16 to modulate the information onto twisted pair line 44 of line 42. As with the carrier signal, station 12 may repeat the received information onto twisted pair line 46 of line 42. However, station 12 may repeat received data only if the data indicates an address other than station 12. For example, if station 12 receives data addressed to one or more terminals 14, station 12 may repeat the data on twisted pair line 44. Thus, terminal devices 14 may communicate information to station 12 and/or to other terminal devices 14 via station 12.

After completing communications, terminal A de-asserts its RTS line, which causes its corresponding modem 16 to discontinue generation of a carrier signal on twisted pair line 44. Modem 16 for station 12 detects the absence of the carrier signal and de-asserts the DCD line to station 12. In response, station 12 de-asserts its RTS line to modem 16, which causes modem 16 to discontinue generating a carrier signal on twisted pair line 46. This, in turn, causes modems 16 for the other terminal devices 14 to de-assert their respective DCD lines, indicating that line 42 has been released. Therefore, terminal devices 14 operate using substantially the same methods as in two-wire multidrop network 10, while station 12 in network 40 acts as a repeater for a signals received.

While the operation of terminal devices in network 40 is similar to that of terminal devices in network 10, network 40 may provide alternative methods for calculating delays between the de-assertion of a DCD line and an attempt to claim line 42. For example, in network 40, propagation delays for signals on line 42 may be double those of network 10, since signals must reach station 12 on line 44 and be repeated back on line 46. However, network 40 contemplates terminal devices 14 and station 12 using any suitable delays and any suitable criteria for calculating delays.

Figure 5:
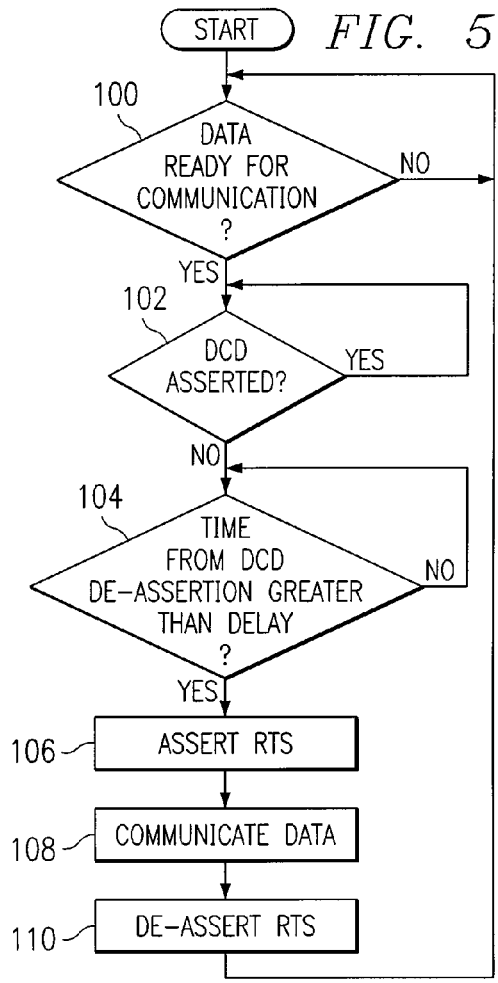
FIG. 5 is a flowchart illustrating a method for communicating information over a serial data interface using the media access control scheme.
Figure 3:
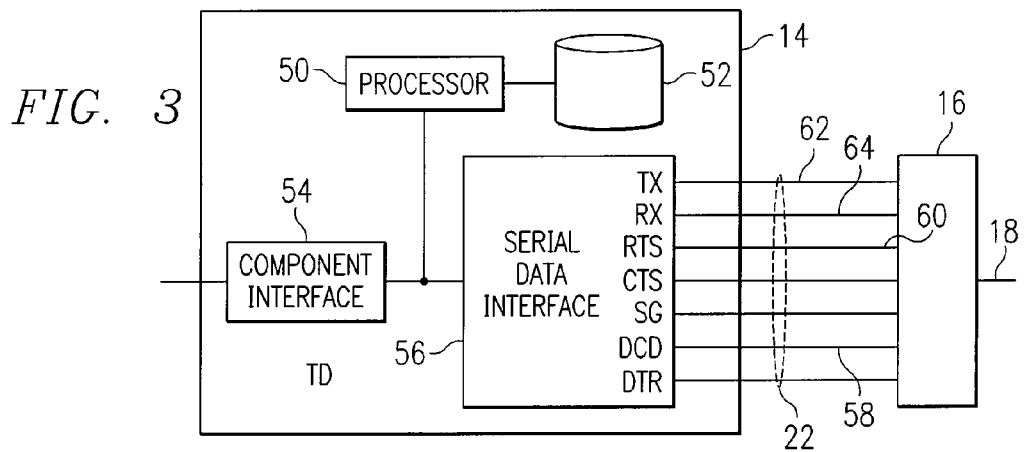
FIG. 3 illustrates an exemplary terminal device for implementing the media access control scheme.
Figure 4:
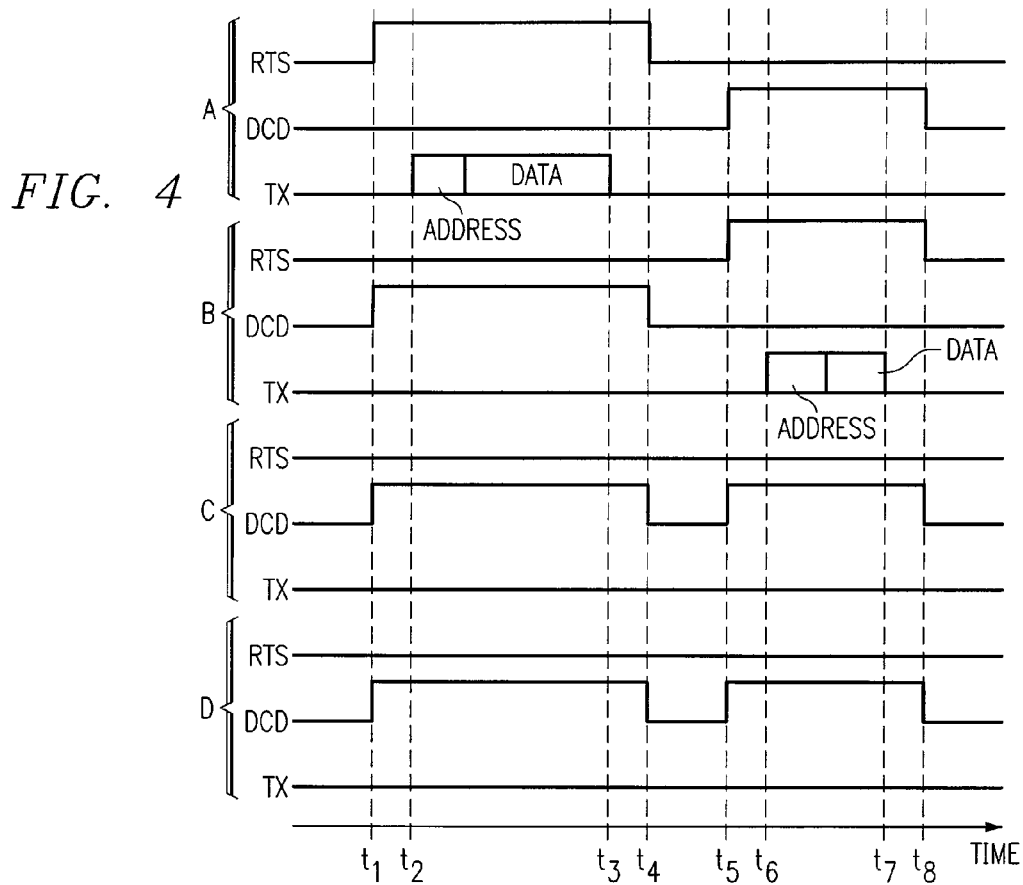
FIG. 4 is a timing diagram demonstrating signals of terminal devices implementing a particular embodiment of the media access control scheme.

The remaining FIGS. 3, 4, and 5 apply to two-wire and four-wire networks. FIG. 3 illustrates functional elements of an exemplary terminal device 14 coupled to line 18 via modem 16. Terminal device 14 includes a processor 50, a memory 52, a component interface 54, and a serial data interface 56. In general, processor 50 controls the management and operation of elements within terminal device 14 to provide communications with other devices coupled to line 18 using a media access control scheme designed to support peer-to-peer communications.

During operation, processor 50 may access information stored by memory 52. Thus, memory 52 may store software, code, applications, components, scripts, data, and/or other suitable information for use by terminal device 14. For example, memory 52 may store data retrieved from component 20 by terminal device 14 using component interface 54. Memory 52 may also store software implementing some or all of the functions described for terminal device 14. Memory 52 represents any suitable combination of volatile or non-volatile data storage devices, such as random access memory (RAM) devices, read only memory (ROM) devices, magnetic storage devices, optical storage devices, or other suitable data storage devices.

Terminal device 14 couples to other elements using component interface 54 and serial data interface 56. Component interface 54 couples to component 20 and allows for the communication of commands and other information between component 20 and terminal device 14. Serial data interface 56 couples to modem 16 via serial line 22 and provides for communications with remote devices such as station 12 and other terminal devices 14. According to a particular embodiment, serial data interface 56 includes a number of lines such as a DCD line 58, an RTS line 60, a transmission line 62, and a receive line 64. According to a particular embodiment, serial data interface 56 represents an RS-232 interface. Thus, serial data interface 56 may have other lines such as a clear to send (CTS), a signal ground (SG), and a data terminal ready (DTR).

As previously discussed, terminal device 14 uses signaling with modem 16 to claim access to line 18 and to detect claims to line 18 by other elements. To claim access to line 18, processor 50 instructs serial data interface 56 to assert RTS line 60, which prompts modem 18 to generate a carrier signal on line 18. While maintaining RTS as asserted, processor 50 may communicate information to a remote element by communicating this information to modem 16, for example using transmission line 62. Modem 16 modulates this information onto line 18 while maintaining the carrier signal. Upon completing a transmission, processor 50 instructs serial data interface 56 to de-assert RTS line 60, which prompts modem 16 to cease generation of the carrier signal on line 18.

Upon modem 16 detecting a carrier signal on line 18, modem 16 asserts DCD line 58, which indicates to processor 50 that another element has claimed access to line 18. While DCD line 58 is asserted, processor 50 refrains from asserting RTS line 60 or from communicating information on line 18. In addition, as previously discussed, processor 50 may wait some predetermined, random, or otherwise calculated delay after detecting the de-assertion of DCD line 58 before asserting RTS line 60 and communicating information. This helps to prevent collisions between data communicated by terminal device 14 and data communicated by other elements such as station 12 and other terminal devices 14.

Terminal device 14 may use these media access control techniques for the communication of any suitable information. For example, terminal device 14 may receive information such as metering information from component 20 using component interface 54. Terminal device 14 may then communicate this information to station 12 using the techniques described. Terminal device 14 may also receive information from other elements such as station 12 and other terminal devices 14 by detecting the assertion of DCD line 58 and receiving information on receive line 64. This received information may include commands or other communications, such as a command to control the operation of component 20. Using these techniques, systems may provide a media access control scheme that supports peer-to-peer communications between station 12 and terminal devices 14. Thus, for example, information communicated between elements in network 10 and network 40 may include packet based communication such as IP packets.

While this example includes specific functional elements, terminal device 14 may include any collection and arrangement of modules. Moreover, each of the functional elements within terminal device 14 may be implemented using any suitable combination and arrangement of hardware and/or software and some or all of the functionalities may be implemented by logic stored on media. This includes computer programs stored on computer readable media, functions stored on programmable logic devices, or any other suitable form of logic contained in media.

FIG. 4 is a timing diagram illustrating signals of RTS lines 60, DCD lines 58, and transmit lines 62 for terminals A, B, C, and D during communications. In general, this timing diagram illustrates the communication of information by terminal A and the subsequent communication of information by terminal B. Terminal A, having information for communication, asserts its RTS line 60 at step $t_1$. This timing diagram assumes that DCD line 58 of terminal A has been de-asserted for an appropriate period of time prior to time $t_1$. In response to the assertion of RTS line 60 of terminal A, modem 16 associated with terminal A generates a carrier signal on line 18, which in turn causes modems 16 for terminals B, C, and D to assert their respective DCD lines 58. Thus, the timing diagram indicates the assertion of DCD lines 58 for terminals B, C, and D at time $t_1$. However, it should be understood that some degree of propagation delay may be inherent in the system and thus DCD lines 58 for terminals B, C, and D may not be asserted until some period of time after $t_1$ according to propagation delays.

After asserting RTS line 60, terminal A begins communicating information at time $t_2$. This may include information for reception by station 12 and/or other terminal devices 14 within the system. Moreover, these transmissions from terminal A may include addressing information to permit the intended recipient to properly receive the information. Thus, while this information may be received by all other elements connected to line 18, the information communicated by terminal A may indicate the intended recipient. At time $t_3$, terminal A completes transmissions, and at time $t_4$, terminal A de-asserts RTS line 60, which prompts modem 16 to discontinue generation of a carrier signal on line 18. Modems 16 for terminals B, C, and D detect the absence of the carrier signal on line 18 and, in response, de-assert their respective DCD lines 58. Therefore, the timeline shows at time $t_4$ the de-assertion of DCD line 58 for terminals B, C, and D.

However, the response of DCD lines 58 for terminals B, C, and D may reflect propagation delays inherent in network 10 and thus may not occur simultaneously with the de-assertion of RTS line 60 of terminal A. Thus, as with the assertion of DCD lines 58, the actual de-assertion may lag the de-assertion of RTS line 60 by some amount. Moreover, while this timeline illustrates a delay between terminal A asserting RTS line 60 and beginning communications, network 10 contemplates terminal A substantially simultaneously beginning communicating information upon assertion of RTS line 60. Similarly, terminal A may substantially simultaneously discontinue asserting RTS line 60 upon completing communications.

According to this example, at some point before the de-assertion of RTS line 60 by terminal A, terminal B identifies information for communication. Thus, upon de-assertion of DCD line 58 at time $t_4$, terminal B begins waiting for a period of time before attempting to claim line 18 and communicate information. The period of time between time $t_4$ and $t_5$ represents this delay between terminal B detecting the de-assertion of DCD line 58 and asserting its RTS line 60 to claim access to line 18. As previously discussed, this delay may include any predetermined, random, and/or dynamically calculated values designed to limit collisions of data transmissions on line 18.

At time $t_5$, terminal B asserts its RTS line 60, which results in modems 16 for terminals A, C, and D asserting their respective DCD lines 58. From time $t_6$ to time $t_7$, terminal B communicates information on transmission line 62. As with the transmission of information by terminal A, the transmission by terminal B may include any suitable information for reception by one of more elements coupled to line 18. After completing transmissions, terminal B de-asserts its RTS line 60 at time $t_8$, which results in the de-assertion of DCD lines 58 for terminals A, C, and D. Thus, this timing diagram illustrates an example of communications by multiple terminal devices 14 and the delay between these communications.

FIG. 5 is a flowchart illustrating a method for communicating information on line 18 using a media access control scheme that supports peer-to-peer communications. The following description of this flowchart details this operation with respect to terminal device 14, however, similar methods may be used by other devices, such as station 12.

Terminal 14 determines whether it has data ready for communication at step 100. If not, terminal device 14 remains idle. However, if terminal device 14 has data ready for communication, terminal device 14 determines whether its DCD line 58 is asserted at step 102. If so, terminal device 14 waits until DCD line 58 is no longer asserted. When DCD line 58 is not asserted, terminal device 14 determines whether the time from the last de-assertion of DCD 58 is greater than a delay at step 104. If not, terminal device 14 waits until the time from last de-assertion of DCD line 58 is greater than the delay. As previously discussed, this delay may be any random, predetermined, and/or dynamically calculated time. This waiting period during the delay represents an attempt by terminal device 14 to minimize the possibility of causing a data collision on line 18.

When the time from the last de-assertion of DCD line 58 is greater than the delay, terminal device 14 asserts RTS line 60 at step 106, communicates the data at step 108, and de-asserts RTS line 60 at step 110. As shown by the example illustrated in the preceding timeline, the assertion of RTS line 60 claims access to line 18 for terminal device 14 while communicating data. Thus, by following the method detailed in this flowchart, terminal device 14 ensures that a delay has passed between the last de-assertion of its DCD line 58 and then claims access to line 18 during communications.

While this flowchart illustrates an exemplary method of operation, terminal device 14 may use any suitable techniques for claiming access to line 18 during communications and delaying such claims after detecting communications of other elements. Thus, many of the steps in this flowchart may take place simultaneously and/or in different order than is shown. For example, as previously discussed, terminal device 14 may simultaneously assert RTS line 60 and begin communicating data. Furthermore, terminal device 14 may use methods with additional steps, fewer steps, and/or different steps, so long as the methods remain appropriate for providing a media access control scheme for devices linked using serial data interfaces.

Although the present invention has been described in several embodiments, a myriad of changes and modifications may be suggested to one skilled in the art, and it intended that the present invention encompass such changes and modifications as fall within the scope of the present appended claims.

What is claimed is:

1. A communications apparatus comprising:
   a serial data interface having a data carrier detect (DCD) line and a request to send (RTS) line each coupled to a modem, wherein the modem couples to a twisted pair line that couples to a plurality of remote devices; and
   a processor operable to detect a de-assertion of the DCD line, to assert the RTS line after a period of time from detecting the de-assertion of the DCD line, to communicate information to a selected one of the remote devices while the RTS line is asserted, and to de-assert the RTS line after communicating the information, wherein the period of time comprises a propagation delay for signals transmitted on the twisted pair line and a random period of time after the propagation delay.

2. The apparatus of claim 1, wherein the serial data interface is an RS-232 interface.

3. The apparatus of claim 1, wherein asserting the RTS line requests the modem to generate a carrier signal that causes assertion of DCD lines for the plurality of remote devices coupled to the twisted pair line.

4. The apparatus of claim 1, wherein the selected remote device comprises a master station managing a plurality of components of a supervisory control and data acquisition (SCADA) system using the twisted pair line.

5. A communications apparatus comprising:
   a serial data interface having a data carrier detect (DCD) line and a request to send (RTS) line each coupled to a modem, wherein the modem couples to a twisted pair line that couples to a plurality of remote devices;
   a processor operable to detect a de-assertion of the DCD line, to assert the RTS line after a period of time from detecting the de-assertion of the DCD line, to communicate information to a selected one of the remote devices while the RTS line is asserted, and to de-assert the RTS line after communicating the information, wherein the processor is further operable to generate internet protocol (IP) packets encoding the data and to communicate the packets to the selected remote device while the RTS line is asserted; and
   a component interface operable to receive data from a component for communication to the selected remote device.

6. A communications apparatus comprising:
   a serial data interface having a data carrier detect (DCD) line and a request to send (RTS) line each coupled to a modem, wherein the modem couples to a twisted pair line that couples to a plurality of remote devices;
   a processor operable to: detect a de-assertion of the DCD line; assert the RTS line after a period of time from detecting the de-assertion of the DCD line; communicate information to a selected one of the remote devices while the RTS line is asserted; and de-assert the RTS line after communicating the information, wherein the processor is further operable to: detect an assertion of the DCD line; receive a communication from the selected remote device, wherein the communication comprises an address and a command; determine that the address indicates the component; and issue the command to the component; and
   a component interface operable to receive data from a component for communication to the selected remote device.

7. The apparatus of claim 1, wherein the propagation delay is a predetermined value.

8. A method for communicating information over a twisted pair line comprising:
   detecting a de-assertion of a data carrier detect (DCD) line for a serial data interface, wherein the serial data interface couples to a modem coupled to the twisted pair line;
   after a period of time from detecting the de-assertion of the DCD line, asserting a request to send (RTS) line for the serial data interface, wherein asserting the RTS line requests the modem to generate a carrier signal that causes assertion of DCD lines for a plurality of remote devices coupled to the twisted pair line, and wherein the period of time comprises a propagation delay for signals transmitted on the twisted pair line;
   communicating information to a selected one of the remote devices while the RTS line is asserted, wherein the information comprises internet protocol (IP) packets; and
   de-asserting the RTS line after communicating the information.

9. The method of claim 8, wherein the serial data interface comprises an RS-232 interface.

10. A method for communicating information over a twisted pair line comprising:
   detecting a de-assertion of a data carrier detect (DCD) line for a serial data interface, wherein the serial data interface couples to a modem coupled to the twisted pair line;
   after a period of time from detecting the de-assertion of the DCD line, asserting a request to send (RTS) line for the serial data interface, wherein asserting the RTS line requests the modem to generate a carrier signal that causes assertion of DCD lines for a plurality of remote devices coupled to the twisted pair line;
   communicating information to a selected one of the remote devices while the RTS line is asserted, wherein the selected remote device comprises a master station managing a plurality of components of a supervisory control and data acquisition (SCADA) system using the twisted pair line;
   de-asserting the RTS line after communicating the information;
   detecting an assertion of the DCD line;
   receiving a communication from the master station, wherein the communication comprises an address and a command;
   determining that the address indicates a local component; and
   issuing the command to the local component.

11. The method of claim 8, wherein the propagation delay is a predetermined value.

12. The method of claim 8, wherein the period of time further comprises a random period of time after the propagation delay.

13. Logic for communicating information over a twisted pair line, the logic encoded in media and operable to:
   detect a de-assertion of a data carrier detect (DCD) line for a serial data interface, wherein the serial data interface couples to a modem coupled to the twisted pair line;
   after a period of time from detecting the de-assertion of the DCD line, assert a request to send (RTS) line for the serial data interface, wherein asserting the RTS line requests the modem to generate a carrier signal that causes assertion of DCD lines for a plurality of remote devices coupled to the twisted pair line;
   communicate information to a selected one of the remote devices while the RTS line is asserted, wherein the information comprises internet protocol (IP) packets; and
   de-assert the RTS line after communicating the information.

14. The logic of claim 13, wherein the serial data interface comprises an RS-232 interface.

15. Logic for communicating information over a twisted pair line, the logic encoded in media and operable to:
   detect a de-assertion of a data carrier detect (DCD) line for a serial data interface, wherein the serial data interface couples to a modem coupled to the twisted pair line;
   after a period of time from detecting the de-assertion of the DCD line, assert a request to send (RTS) line for the serial data interface, wherein asserting the RTS line requests the modem to generate a carrier signal that causes assertion of DCD lines for a plurality of remote devices coupled to the twisted pair line;
   communicate information to a selected one of the remote devices while the RTS line is asserted, wherein the selected remote device comprises a master station managing a plurality of components of a supervisory control and data acquisition (SCADA) system using the twisted pair line;
   de-assert the RTS line after communicating the information;
   detect an assertion of the DCD line;
   receive a communication from the master station, wherein the communication comprises an address and a command;
   determine that the address indicates a local component; and
   issue the command to the local component.

16. Logic for communicating information over a twisted pair line, the logic encoded in media and operable to:
   detect a de-assertion of a data carrier detect (DCD) line for a serial data interface, wherein the serial data interface couples to a modem coupled to the twisted pair line;
   after a period of time from detecting the de-assertion of the DCD line, assert a request to send (RTS) line for the serial data interface, wherein asserting the RTS line requests the modem to generate a carrier signal that causes assertion of DCD lines for a plurality of remote devices coupled to the twisted pair line, and wherein the period of time comprises a propagation delay for signals transmitted on the twisted pair line;
   communicate information to a selected one of the remote devices while the RTS line is asserted; and
   de-assert the RTS line after communicating the information.

17. The logic of claim 16, wherein the propagation delay is a predetermined value.

18. The logic of claim 16, wherein the period of time further comprises a random period of time after the propagation delay.

19. A communications apparatus comprising:
   means for detecting a de-assertion of a data carrier detect (DCD) line for a serial data interface, wherein the serial data interface couples to a modem coupled to a twisted pair line;
   means for, after a period of time from detecting the de-assertion of the DCD line, asserting a request to send (RTS) line for the serial data interface, wherein asserting the RTS line requests the modem to generate a carrier signal that causes assertion of DCD lines for a plurality of remote devices coupled to the twisted pair line;
   means for communicating information to a selected one of the remote devices while the RTS line is asserted;
   means for de-asserting the RTS line after communicating the information; and
   means for detecting an assertion of the DCD line;
   means for receiving a communication from a master station, wherein the communication comprises an address and a command;
   means for determining that the address indicates a local component; and
   means for issuing the command to the local component.

* * * * *